United States Patent
Yang

(10) Patent No.: US 10,417,297 B2
(45) Date of Patent: Sep. 17, 2019

(54) WEBPAGE LOADING METHOD AND SYSTEM

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Peng Yang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 117 days.

(21) Appl. No.: 15/537,702

(22) PCT Filed: Dec. 11, 2015

(86) PCT No.: PCT/CN2015/097075
§ 371 (c)(1),
(2) Date: Jun. 19, 2017

(87) PCT Pub. No.: WO2016/101795
PCT Pub. Date: Jun. 30, 2016

(65) Prior Publication Data
US 2018/0004857 A1    Jan. 4, 2018

(30) Foreign Application Priority Data
Dec. 26, 2014 (CN) .......................... 2014 1 0832010

(51) Int. Cl.
*G06F 17/30* (2006.01)
*G06F 9/445* (2018.01)
(Continued)

(52) U.S. Cl.
CPC ...... *G06F 16/9574* (2019.01); *G06F 9/44521* (2013.01); *G06F 16/955* (2019.01); *G06F 3/04855* (2013.01)

(58) Field of Classification Search
CPC .......... G06F 17/30902; G06F 9/44521; G06F 17/30876; G06F 3/04855
(Continued)

(56) References Cited

U.S. PATENT DOCUMENTS

| 2006/0038015 A1* | 2/2006 | Ise | G06F 17/30861 235/462.1 |
| 2009/0106687 A1* | 4/2009 | De Souza Sana | G06F 3/0481 715/784 |
| 2015/0007101 A1* | 1/2015 | Lewis | G06F 3/0485 715/784 |

FOREIGN PATENT DOCUMENTS

| CN | 101828166 A | 9/2010 |
| CN | 102541848 A | 7/2012 |

(Continued)

OTHER PUBLICATIONS

International Search Report with English translation and Written Opinion for Application No. PCT/CN2015/097075 dated Mar. 1, 2016 (10 pages).

*Primary Examiner* — Tadesse Hailu
*Assistant Examiner* — Darrin Hope
(74) *Attorney, Agent, or Firm* — Michael Best & Friedrich LLP

(57) ABSTRACT

Webpage loading method and system. While browsing a webpage, a user can uninterruptedly browse subsequent contents without waiting for page loading since whether subsequent pages need to be loaded is determined by the prediction of remaining page browsing time. The method comprises: in response to a page loading completion event, recording a current page end scroll bar value, a current page (Continued)

initial scroll bar value and a current page loading completion moment; in response to a scroll bar scrolling event, recording a present scroll bar triggering moment and a present scroll bar value; calculating a page browsing speed and a remaining page browsing time; and when the remaining page browsing time meets a preset condition, sending to a server a page acquisition request related to subsequent pages of the current page and loading and updating page data about the subsequent pages to the end of the current page.

10 Claims, 3 Drawing Sheets

(51) Int. Cl.
  *G06F 3/0485* (2013.01)
  *G06F 16/957* (2019.01)
  *G06F 16/955* (2019.01)

(58) Field of Classification Search
  USPC .......................................... 715/783–788, 760
  See application file for complete search history.

(56) References Cited

FOREIGN PATENT DOCUMENTS

| | | |
|---|---|---|
| CN | 102637201 A | 8/2012 |
| CN | 103885965 A | 6/2014 |
| CN | 104572912 A | 4/2015 |

* cited by examiner

WEBPAGE LOADING METHOD AND SYSTEM

CROSS-REFERENCE TO RELATED APPLICATIONS

This application is a national stage filing under 35 U.S.C. 371 of International Application No. PCT/CN2015/097075 filed Dec. 11, 2015, which claims the foreign priority benefit of Chinese Patent Application No. 201410832010.1 filed Dec. 26, 2014, which are incorporated by reference herein in their entireties.

TECHNICAL FIELD

The present invention relates to a webpage-related technical field, in particular a webpage loading method and system.

BACKGROUND ART

When a user browses webpages, the user needs to click on the hyperlink of a next page to get the next page after completing browsing the current page. It is inconvenient to the user.

To this end, the existing technology monitors user's browsing status, and triggers a web program such as JavaScript when the user browses to the end of the webpage, and then displays the content of the subsequent page at the end of the current page and updates the scroll bar, so that the user continue to browse the following content.

However, with the existing technology, a user has to wait for the page to be loaded when the user browses to the end of a webpage so that the page browsing is not smooth.

SUMMARY OF INVENTION

Based on this, it is necessary to provide a webpage loading method and system for solving the technical problem that a user has to wait for page loading when a user browses to the end of a webpage, which results in unsmooth webpage browsing.

A webpage loading method comprising:

a scroll bar parameter acquisition step, including recording a current page end scroll bar value, a current page beginning scroll bar value, and a current page loading completion time for a current page in response to a page loading completion event;

a scroll bar scrolling triggering step, including: recording a present scroll bar triggering time and a present scroll bar value for the scroll bar in response to a scroll bar scrolling event, and performing a scroll bar determining step;

the scroll bar determining step, including: calculating a page browsing speed based on at least one present scroll bar value, at least one present scroll bar triggering time, the current page beginning scroll bar value, and the current page loading completion time, calculating remaining page browsing time based on the page browsing speed, the current page end scroll bar value, and the current page beginning scroll bar value, and triggering a page loading step when the remaining page browsing time meets a preset condition; and the page loading step, including: querying a subsequent page of the current page, sending to a server a page acquisition request for the subsequent page, loading and updating page data returned by the server for the subsequent page to the end of the current page.

A webpage loading system comprising:

a scroll bar parameter acquisition module, which includes recording a current page end scroll bar value, a current page beginning scroll bar value, and a current page loading completion time for a current page in response to a page loading completion event;

a scroll bar scrolling triggering module, which includes recording a present scroll bar triggering time and a present scroll bar value for the scroll bar in response to a scroll bar scrolling event, and performing a scroll bar determining module;

the scroll bar determining module, which includes calculating a page browsing speed based on at least one present scroll bar value, at least one present scroll bar triggering time, the current page beginning scroll bar value, and the current page loading completion time, calculating remaining page browsing time based on the page browsing speed, the current page end scroll bar value, and the current page beginning scroll bar value, and triggering a page loading module when the remaining page browsing time meets a preset condition; and the page loading module, which includes querying a subsequent page of the current page, sending to a server a page acquisition request for the subsequent page, loading and updating page data returned by the server for the subsequent page to the end of the current page.

The present invention determines whether or not a subsequent page need be loaded by predicting the remaining page browsing time. Because there is no need to wait till the end of the page for starting loading, when browsing vertically browsed webpages such as WeChat and Microblogging a user is able to browse the subsequent content uninterruptedly with enhanced user experience, without waiting for the page loading.

DETAILED DESCRIPTION

The invention will now be described in further detail with reference to the accompanying drawings and specific embodiments.

Figure 1:
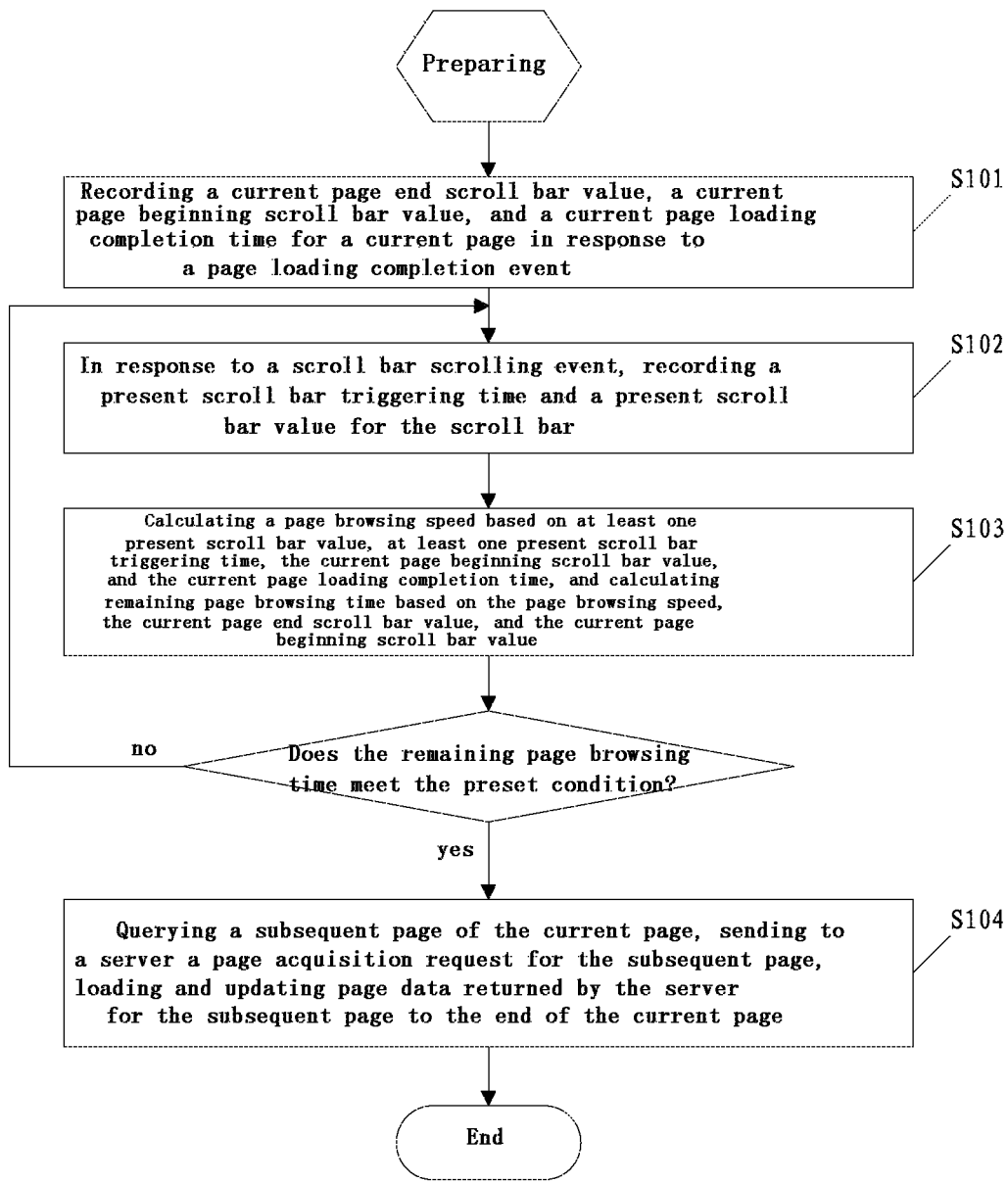
FIG. 1 is a flow chart of a webpage loading method of the present invention.

As shown in FIG. 1, the flow chart of, a webpage loading method of the present invention, comprising:

Step S101, including recording a current page end scroll bar value, a current page beginning scroll bar value, and a current page loading completion time for a current page in response to a page loading completion event;

Step S102, including: recording a present scroll bar triggering time and a present scroll bar value for the scroll bar in response to a scroll bar scrolling event, and performing Step S103;

Step S103, including: calculating a page browsing speed based on at least one present scroll bar value, at least one present scroll bar triggering time, the current page beginning scroll bar value, and the current page loading completion time, calculating remaining page browsing time based on the page browsing speed, the current page end scroll bar value, and the current page beginning scroll bar value, and triggering Step S104 when the remaining page browsing time meets a preset condition; and Step S104, including: querying a subsequent page of the current page, sending to a server a page acquisition request for the subsequent page, loading and updating page data returned by the server for the subsequent page to the end of the current page.

The scroll bar will have a scroll bar value indicating its position coordinates on the page or screen while scrolling. In step S101, the current page end scroll bar value refers to the position coordinates of the scroll bar on the page or screen when the current page is scrolled to the bottom, and the current page beginning scroll bar value refers to the position coordinates of the scroll bar when the current page is scrolled to the top. It takes certain time for the scripting language on the webpage to complete the page loading from performing page loading event, and the current page loading completion time refers to the time when the current page loading is completed.

In Step S102, a scroll bar scrolling event is triggered by dragging of the scroll bar. For a computer user, by dragging the scroll bar with a mouse, or by scrolling the scroll bar with a roller of the mouse, the scroll bar scrolling event is generated, and there by Step S102 is triggered. For a mobile phone user, by dragging the page with a keyboard, or by dragging the scroll bar or dragging the page with touch operation by a user using a touch screen, a scroll bar scrolling event is generated, thereby Step S102 is triggered. The present scroll bar triggering time refers to the time when Step S102 is triggered, and the present scroll bar value refers to the scroll bar value of the scroll bar when Step S102 is triggered, i.e., the position coordinates of the scroll bar on the page or screen when Step S102 is triggered. Step S102 may be triggered several times, and each trigger involves a present scroll bar triggering time and a present scroll bar value of the scroll bar, so that a plurality of present scroll bar triggering times and present scroll bar values are obtained.

In Step S103, a page browsing speed is obtained by calculating based on the present scroll bar values, the present scroll bar triggering times, the current page beginning scroll bar value, and the current page loading completion time. A remaining page browsing time is predicted based on the page browsing speed. When the remaining page browsing time meets a preset condition, Step S104 is triggered to load the webpage. The preset condition may be a preset threshold, i.e., when the remaining page browsing time is less than the preset threshold, Step S104 is triggered.

The invention loads a subsequent webpage in advance by predicting remaining webpage browsing time, so that a user can browse the subsequent contents uninterruptedly with enhanced user experience, without waiting for the page to load.

The present invention is preferably used on mobile phones or other mobile devices, particularly when the mobile phones or mobile devices access a webpage using low speed networks. Low speed networks is e.g., General Packet Radio Service (GPRS). Since the speed of the network is low, with the existing technology, users need to wait for a long time to load a subsequent page, and cannot browse quickly and smoothly.

In one of the embodiments, the page browsing speed is calculated by $$v_r = \frac{k - k_s}{t - t_s},$$

where $v_r$ is the page browsing speed, k is the present scroll bar value, $k_s$ is the current page beginning scroll bar value, t is the present scroll bar triggering time, and $t_s$ is the current page loading completion time.

When step S102 is triggered, the difference between the present scroll bar value and the current webpage beginning scroll bar value is calculated to determine the scrolling distance of the scroll bar, and the difference between the present scroll bar triggering time and the current page loading completion time is calculated to determine the time that it takes the scroll bar to move by the current distance from the start of scrolling, and the page browsing speed is the ratio of the scrolling distance to the time.

In one of the embodiments, Step S102 is triggered at least once, one present scroll bar triggering time and one present scroll bar value being recorded at one triggering, and the page browsing speed is calculated by $$v_r = \frac{\sum_{i=1}^{n} \frac{k_i - k_s}{t_i - t_s}}{n},$$

where $v_r$ is the page browsing speed, $k_i$ is an $i^{th}$ present scroll bar value, $k_s$ is the current page beginning scroll bar value, $t_i$ is an $i^{th}$ present scroll bar triggering time, $t_s$ is the current page loading completion time, and n is a total number of times Step S102 has been triggered.

A user may drag the scroll bar for multiple times while browsing a page, so Step S102 will be triggered for multiple times. In the embodiment, the average of the browsing speeds calculated for each trigger is used as the page browsing speed so that it is more realistic.

In one of the embodiments, the remaining page browsing time is calculated by $t_f = v_r \times (k_e - k)$, where $t_f$ is the remaining page browsing time, $v_r$ is the page browsing speed, k is the present scroll bar value, and $k_e$ is the current page end scroll bar value.

In the embodiment, the remaining page browsing time is obtained by calculating with the remaining distance which is the difference between the present scroll bar value and the current page end scroll bar value, and the page browsing speed.

In one of the embodiments, Step S101 further includes recording a current page loading elapsed time for the current page, and said preset condition is that the remaining page browsing time is less than or equal to the current page loading elapsed time.

In the embodiment, the loading time for a subsequent page is predicted based on the current page loading elapsed time. A user's operating behavior is calculated according to Step S101-Step S103 while the user is browsing a webpage to analyze the client's browsing speed, which is then compared to the current page loading elapsed time, and the loading operation for a subsequent page is triggered in advance. Using the page loading elapsed time as the preset condition in the embodiment, a user's browsing habits can be captured more accurately as compared to not triggering the page loading until the end of the page in prior art. Moreover, since the condition involves comparison of time, it is not restricted by the size of the screen or the length of the page, resulting in a more accurate timing of loading.

Figure 2:
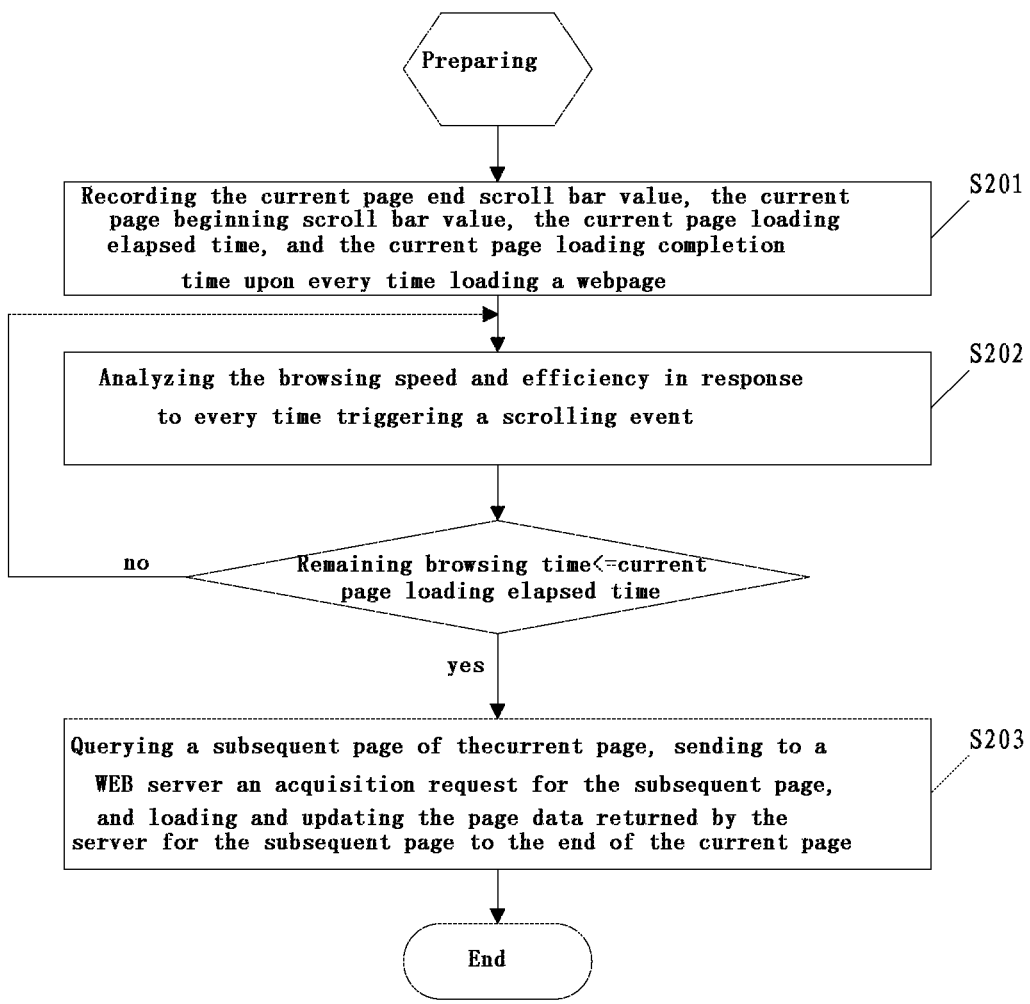
FIG. 2 is a flow chart of the most preferred embodiment of the present invention.

FIG. 2 shows the flow chart of the most preferred embodiment of the present invention, comprising:

Step S201 of while a user is browsing a page and the page loading is completed:

recording the beginning position (scroll bar value) of the current webpage, i.e., the current page beginning scroll bar value, recording the current page end scroll bar value, the current page beginning scroll bar value, the current page loading elapsed time, and the current page loading completion time upon every time loading a webpage;

Step S202 of analyzing the browsing speed and efficiency in response to every time triggering a scrolling event, including:

recording the present scroll bar triggering time and the present scroll bar value every time the scroll bar scrolling event is triggered by clicking the scroll bar or sliding the page by a user;

calculating the page browsing speed with the formula $$v_r = \frac{\sum_{i=1}^{n} \frac{k_i - k_s}{t_i - t_s}}{n},$$

where $v_r$ is the page browsing speed, $k_i$ is an $i^{th}$ present scroll bar value, $k_s$ is the current page beginning scroll bar value, $t_i$ is an $i^{th}$ present scroll bar triggering time, $t_s$ is the current page loading completion time, and n is a total number of times for which Step S202 is triggered, Page browsing time=(current page end scroll bar value−current page beginning scroll bar value)×browsing speed;

Calculating the remaining page browsing time using: remaining browsing time=(browsing speed)×(current page end scroll bar value−present scroll bar value); and If (remaining browsing time <=current page loading elapsed time) is satisfied, Step S203 is triggered to load the content of a subsequent page;

Step S203 of loading the content of a subsequent page, including:

querying to follow the serial number of data displayed on the last line of the current page, requesting a WEB server through JavaScript to query subsequent data according to the setting of the number of lines displayed per page, and loading and updating the data to the end of the current page through JavaScript. Then Step S201 is repeated.

Figure 3:
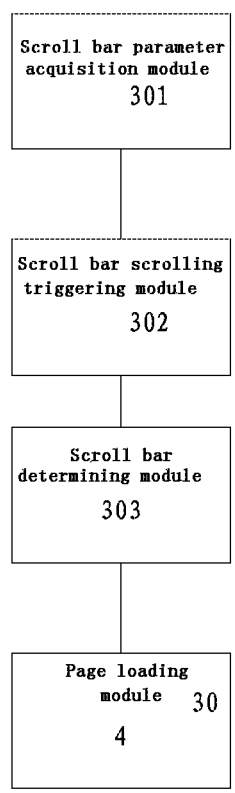
FIG. 3 is a structural block diagram of a webpage loading system of the present invention.

FIG. 3 shows the structural block diagram of a webpage loading system of the present invention, comprising a scroll bar parameter acquisition module 301, which includes recording a current page end scroll bar value, a current page beginning scroll bar value, and a current page loading completion time for a current page in response to a page loading completion event;

a scroll bar scrolling triggering module 302, which includes recording a present scroll bar triggering time and a present scroll bar value for the scroll bar in response to a scroll bar scrolling event, and performing a scroll bar determining module 303;

the scroll bar determining module 303, which includes calculating a page browsing speed based on at least one of said present scroll bar value, at least one present scroll bar triggering time, the current page beginning scroll bar value, and the current page loading completion time, and calculating remaining page browsing time based on the page browsing speed, the current page end scroll bar value, and the current page beginning scroll bar value, and triggering a page loading module 304 when the remaining page browsing time meets a preset condition; and the page loading module 304, which includes querying a subsequent page of the current page, sending to a server a page acquisition request for the subsequent page, loading and updating page data returned by the server for the subsequent page to the end of the current page.

In one of the embodiments, the page browsing speed is calculated by $$v_r = \frac{k - k_s}{t - t_s},$$

where $v_r$ is the page browsing speed, k is the present scroll bar value, $k_s$ is the current page beginning scroll bar value, t is the present scroll bar triggering time, and $t_s$ is the current page loading completion time.

In one of the embodiments, the scroll bar scrolling triggering module is triggered at least once, one present scroll bar triggering time and one present scroll bar value being recorded at one triggering, and the page browsing speed is calculated by $$v_r = \frac{\sum_{i=1}^{n} \frac{k_i - k_s}{t_i - t_s}}{n},$$

where $v_r$ is the page browsing speed, $k_i$ is an $i^{th}$ present scroll bar value, $k_s$ is the current page beginning scroll bar value, $t_i$ is an $i^{th}$ present scroll bar triggering time, $t_s$ is the current page loading completion time, and n is a total number of times the scroll bar scrolling triggering module has been triggered.

In one of the embodiments, the remaining page browsing time is calculated by $t_f = v_r \times (k_e - k)$, where $t_f$ is the remaining page browsing time, $v_r$ is the page browsing speed, k is the present scroll bar value, and $k_e$ is the current page end scroll bar value.

In one of the embodiments, said scroll bar parameter acquisition module further includes recording a current page loading elapsed time for the current page, and said preset condition is that the remaining page browsing time is less than or equal to the current page loading elapsed time.

The embodiments described above are only several modes of implementation of the invention, and though being explained in particular and in detail, they should not be construed as limiting the scope of the invention. It should be noted that various alterations and improvements can be made by those skilled in the art without departing from the concept of the present invention, and all of these will fall within the scope of the claimed present invention. Accordingly, the protection scope of the present invention should be determined by the appended claims.

The invention claimed is:

1. A webpage loading method comprising:
a scroll bar parameter acquisition step, including recording a current page end scroll bar value, a current page beginning scroll bar value, and a current page loading completion time for a current page in response to a page loading completion event;
a scroll bar scrolling triggering step, including: recording a present scroll bar triggering time and a present scroll bar value for the scroll bar in response to a scroll bar scrolling event, and performing a scroll bar determining step;
the scroll bar determining step, including: calculating a page browsing speed based on at least one present scroll bar value, at least one present scroll bar triggering time, the current page beginning scroll bar value, and the current page loading completion time, calculating remaining page browsing time based on the page browsing speed, the current page end scroll bar value, and the current page beginning scroll bar value, and triggering a page loading step when the remaining page browsing time meets a preset condition; and the page loading step, including: querying a subsequent page of the current page, sending to a server a page acquisition request for the subsequent page, loading and updating page data returned by the server for the subsequent page to the end of the current page.

2. The webpage loading method according to claim 1, wherein the page browsing speed is calculated by $$v_r = \frac{k - k_s}{t - t_s},$$

where $v_r$ is the page browsing speed, k is the present scroll bar value, $k_s$ is the current page beginning scroll bar value, t is the present scroll bar triggering time, and $t_s$ is the current page loading completion time.

3. The webpage loading method according to claim 1, wherein the scroll bar scrolling triggering step is triggered at least once, one present scroll bar triggering time and one present scroll bar value being recorded at one triggering, and the page browsing speed is calculated by $$v_r = \frac{\sum_{i=1}^{n} \frac{k_i - k_s}{t_i - t_s}}{n},$$

where $v_r$ is the page browsing speed, $k_i$, is an $i^{th}$ present scroll bar value, $k_s$ is the current page beginning scroll bar value, $t_i$, is an $i^{th}$ present scroll bar triggering time, $t_s$ is the current page loading completion time, and n is a total number of times the scroll bar scrolling triggering step has been triggered.

4. The webpage loading method according to claim 1, wherein the remaining page browsing time is calculated by $t_f = v_r \times (k_e - k)$, where $t_f$ is the remaining page browsing time, $v_r$ is the page browsing speed, k is the present scroll bar value, and $k_e$ is the current page end scroll bar value.

5. The webpage loading method according to claim 1, wherein said scroll bar parameter acquisition step further includes recording a current page loading elapsed time for the current page, and said preset condition is that the remaining page browsing time is less than or equal to the current page loading elapsed time.

6. A webpage loading system comprising:

a mobile device configured to record a current page end scroll bar value, a current page beginning scroll bar value, and a current page loading completion time for a current page in response to a page loading completion event;

record a present scroll bar triggering time and a present scroll bar value for the scroll bar in response to a scroll bar scrolling event;

calculate a page browsing speed based on at least one present scroll bar value, at least one present scroll bar triggering time, the current page beginning scroll bar value, and the current page loading completion time, calculate remaining page browsing time based on the page browsing speed, the current page end scroll bar value, and the current page beginning scroll bar value; and when the remaining page browsing time meets a preset condition, query a subsequent page of the current page, send to a server a page acquisition request for the subsequent page, load and update page data returned by the server for the subsequent page to the end of the current page.

7. The webpage loading system according to claim 6, wherein the page browsing speed is calculated by $$v_r = \frac{k - k_s}{t - t_s},$$

where $v_r$ is the page browsing speed, k is the present scroll bar value, $k_s$ is the current page beginning scroll bar value, t is the present scroll bar triggering time, and $t_s$ is the current page loading completion time.

8. The webpage loading system according to claim 6, wherein the mobile device is configured to record a present scroll bar triggering time and a present scroll bar value for the scroll bar in response to a scroll bar scrolling event at least once, one present scroll bar triggering time and one present scroll bar value being recorded in response to each event, and the page browsing speed is calculated by $$v_r = \frac{\sum_{i=1}^{n} \frac{k_i - k_s}{t_i - t_s}}{n},$$

where $v_r$ is the page browsing speed, $k_i$ is an $i^{th}$ present scroll bar value, $k_s$ is the current page beginning scroll bar value, $t_i$ is an $i^{th}$ present scroll bar triggering time, $t_s$ is the current page loading completion time, and n is a total number of times a present scroll bar triggering time and a present scroll bar value for the bar is recorded.

9. The webpage loading system according to claim 6, wherein the remaining page browsing time is calculated by $t_f = v_r \times (k_e - k)$, where $t_f$ is the remaining page browsing time, $v_r$ is the page browsing speed, k is the present scroll bar value, and $k_e$, is the current page end scroll bar value.

10. The webpage loading system according to claim 6, wherein the mobile device is further configured to record a current page loading elapsed time for the current page, and said preset condition is that the remaining page browsing time is less than or equal to the current page loading elapsed time.

* * * * *